United States Patent
Kitahara

(10) Patent No.: US 8,980,396 B2
(45) Date of Patent: *Mar. 17, 2015

(54) OPTICAL INFORMATION RECORDING MEDIUM

(71) Applicant: FUJIFILM Corporation, Minato-ku, Tokyo (JP)

(72) Inventor: Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,253

(22) Filed: Sep. 25, 2013

(65) Prior Publication Data

US 2014/0023816 A1     Jan. 23, 2014

Related U.S. Application Data

(63) Continuation of application No. PCT/JP2011/073287, filed on Oct. 11, 2011.

(30) Foreign Application Priority Data

Mar. 25, 2011 (JP) .................. 2011-068714

(51) Int. Cl.
    *G11B 7/24*       (2013.01)
    *G11B 7/24041*    (2013.01)
    (Continued)

(52) U.S. Cl.
CPC ........ *G11B 7/24041* (2013.01); *G11B 7/00452* (2013.01); *G11B 7/24038* (2013.01); *G11B 7/248* (2013.01); *G11B 2007/00457* (2013.01); *G11B 7/24067* (2013.01)
USPC ............... 428/64.1; 428/64.4; 430/270.11

(58) Field of Classification Search
CPC ........ G11B 7/244; G11B 7/245; G11B 7/246; G11B 2/257
See application file for complete search history.

(56) References Cited

U.S. PATENT DOCUMENTS 5,912,257 A    6/1999    Prasad et al.
6,402,037 B1    6/2002    Prasad et al.
(Continued)

FOREIGN PATENT DOCUMENTS

JP    2000-132865 A    5/2000
JP    2001-520637 A    10/2001
(Continued)

OTHER PUBLICATIONS

Kurt F. Wissbrun, "Thermal expansion and flow model for pit formation in laser marking of polymeric film optical disks", Journal of Applied Physics, 1987, pp. 1123-1124, vol. 62.

(Continued)

*Primary Examiner* — Elizabeth Mulvaney
(74) *Attorney, Agent, or Firm* — Sughrue Mion, PLLC

(57) ABSTRACT

An optical information recording medium 10 includes a plurality of recording layers 14, and intermediate layers 15 each provided between the recording layers 14. The optical information recording medium 10 is configured such that first and second intermediate layers 15A, 15B having different refractive indices are arranged alternately with one recording layer 14 interposed therebetween, that $((n3-n1)/(n3+n1))^2 \leq 0.001$ is satisfied, where n1 represents a refractive index of the recording layer 14, and n3 represents a refractive index of the second intermediate layer 15B, and that when a recording layer 14 is irradiated with a recording beam RB and generates heat by absorption of the recording beam RB, an interface (reflection interface 18A) between the recording layer 14 and the first intermediate layer 15A adjacent to this recording layer 14 undergoes a change of shape to record information (recording spot M).

8 Claims, 9 Drawing Sheets

(51) Int. Cl.
*G11B 7/0045* (2006.01)
*G11B 7/24067* (2013.01)
*G11B 7/24038* (2013.01)
*G11B 7/248* (2006.01)

(56) References Cited

U.S. PATENT DOCUMENTS

| 6,515,956 | B2 | 2/2003 | Tamada |
| 2002/0009037 | A1 | 1/2002 | Tamada |
| 2006/0072437 | A1 | 4/2006 | Shiono et al. |
| 2010/0035013 | A1 | 2/2010 | Kubo et al. |
| 2010/0055448 | A1 | 3/2010 | Tomura et al. |

FOREIGN PATENT DOCUMENTS

| JP | 2001-325745 | A | 11/2001 |
| JP | 2004-095142 | A | 3/2004 |
| JP | 2008-087476 | A | 4/2008 |
| JP | 2008-130102 | A | 6/2008 |
| JP | 4290650 | B2 | 7/2009 |
| JP | 2009-221563 | A | 10/2009 |

OTHER PUBLICATIONS

International Search Report of PCT/JP2011/073287 dated Jan. 17, 2012, 5 pages in Japanese and English.

Yuki Suzuki et al., "The static recording and readout of the twenty-recording layers containing organic dye materials," ISOM'09, Technical Digest, p. 202, published Oct. 6, 2009, presentation No. Tu-PP-09, 2 pages.

FIG.4
(a)
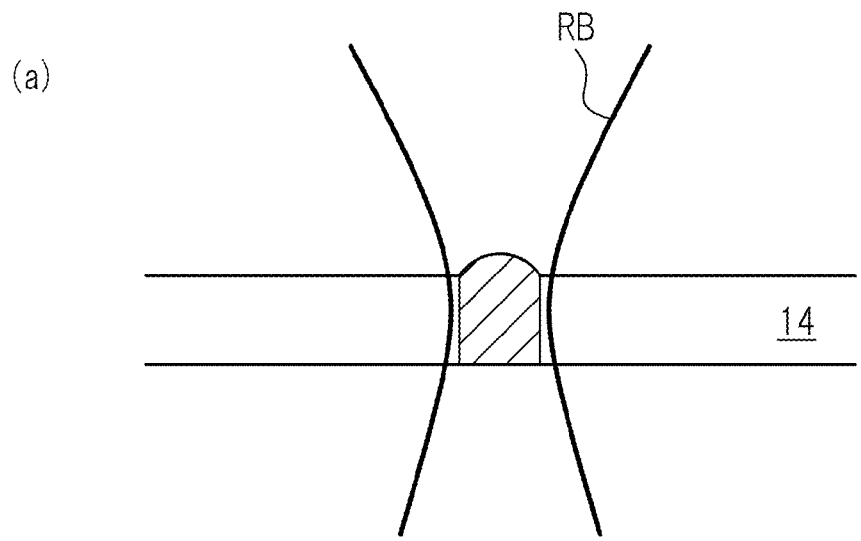
(b)
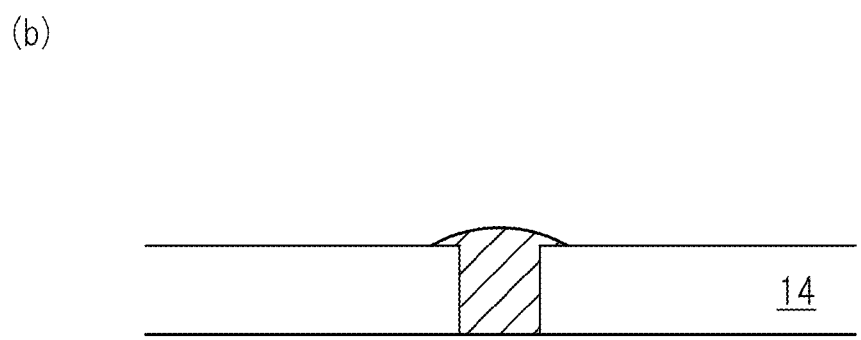
(c)
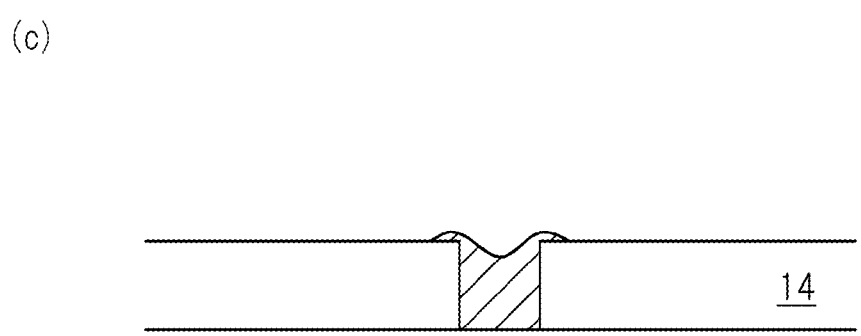

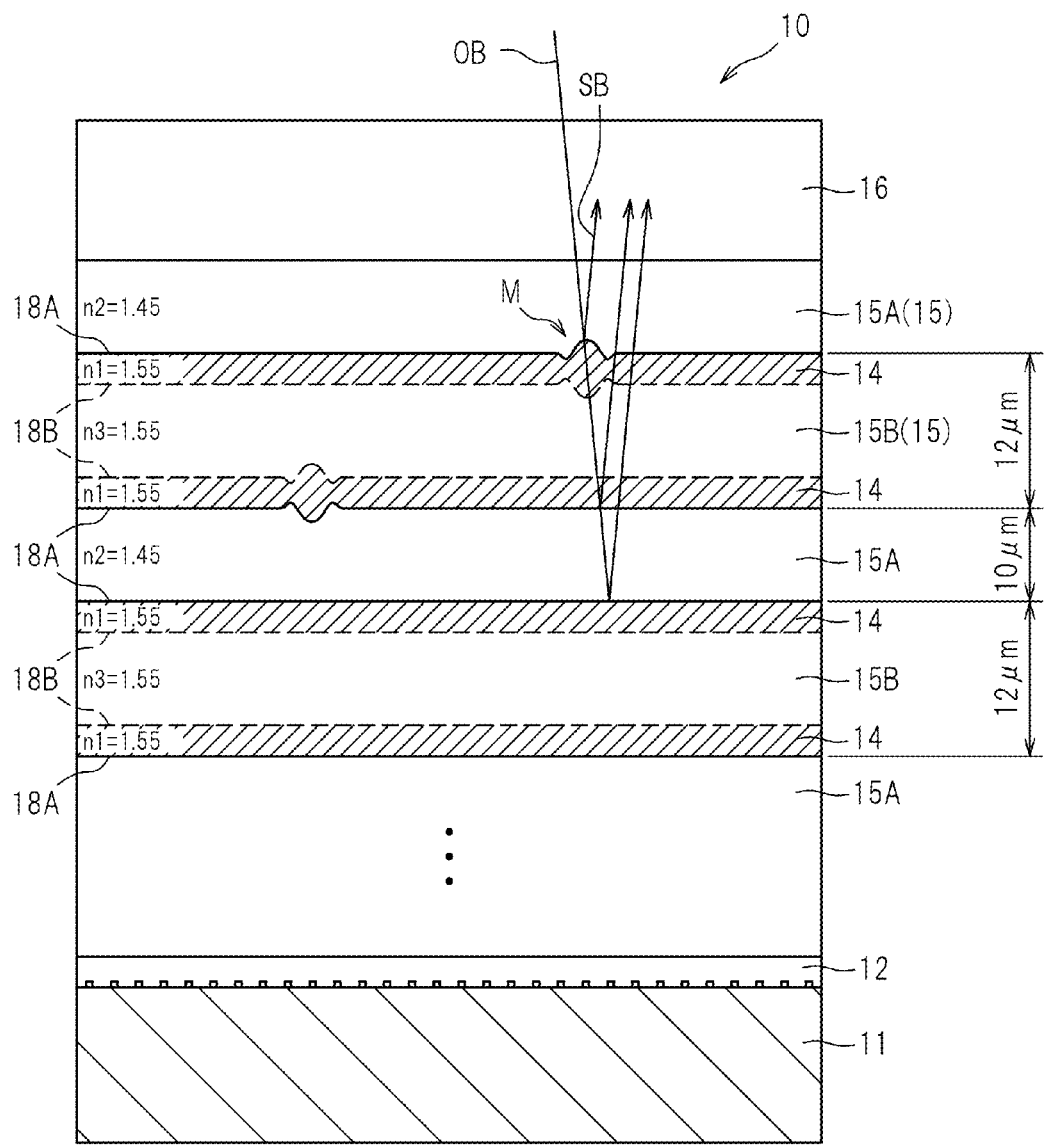

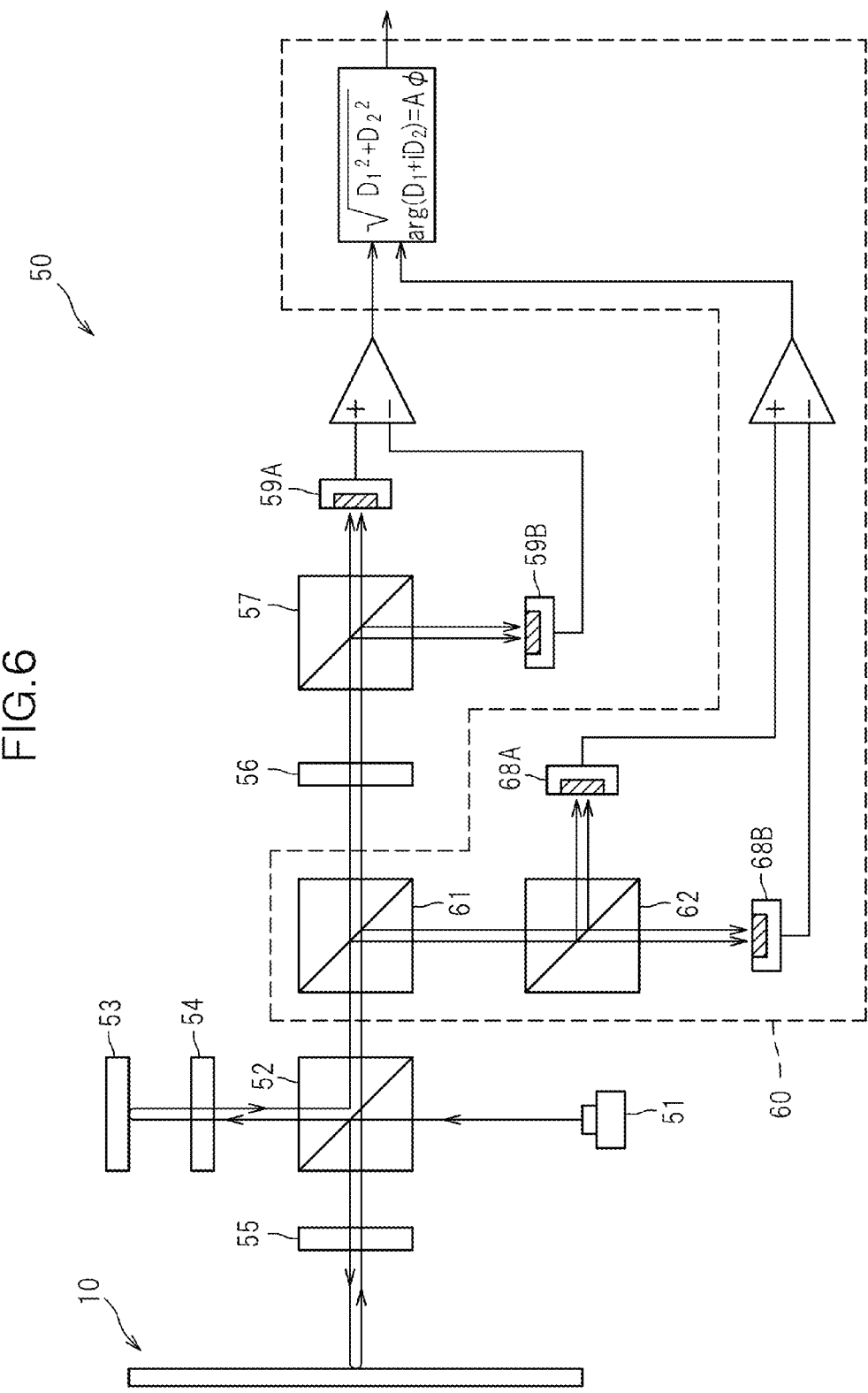

FIG. 7

| | Example 1 | Example 2 | Example 3 | Example 4 | Comparative Example 1 | Comparative Example 2 |
|---|---|---|---|---|---|---|
| Polymer binder | PVAc | PVAc | PVAc | PMMA | None | Polybisphenol-A-carbonate |
| Dye | C-1 | C-2 | C-1 + C-2 | C-2 | C-2 | C-2 |
| Glass transition temperature of Polymer binder [°C] | 32 | 32 | 32 | 104 | - | 147 |
| Melting point or Decomposition point [°C] | 349 | 138 | 138 | 138 | 138 | 138 |
| Film thickness [µm] | 1.0 | 1.0 | 1.0 | 1.0 | 0.1 | 1.0 |
| Refractive index of Recording layer [%] | 1.48 | 1.48 | 1.48 | 1.50 | 1.60 | 1.60 |
| Absorption ratio (Wavelength: 522 nm) [%] | 1.8 | 0 | 1.8 | 0 | 1.8 | 0 |
| Time required for Recording [µsec] | 15 | 90 | 5 | 450 | Unrecordable | Unrecordable |

OPTICAL INFORMATION RECORDING MEDIUM

CROSS-REFERENCE TO RELATED APPLICATION(S)

This application is a continuation application of International Application No. PCT/JP2011/073287 filed on Oct. 11, 2011, which claims priority to Japanese Patent Application No. 2011-068714 filed on Mar. 25, 2011, the disclosures of which are incorporated herein by reference in their entireties.

TECHNICAL FIELD

The present invention relates to an optical information recording medium including a plurality of recording layers.

BACKGROUND ART

To record information in multiple layers of an optical information recording medium, in recent years, research has been made on a method for causing a recording material contained in the optical information recording medium to produce an optical change using a multi-photon absorption reaction such as two-photon absorption (see, for example, Patent Literature 1). Similar to a widely-used conventional optical information recording medium with a single recording layer, according to an optical information recording medium utilizing a multi-photon absorption reaction, a change in the refractive index of a recording material at a recording region and the thickness of the recording layer are determined, in consideration of the fact that reflected beams of light reflected at both upper and lower interfaces of the recording layer interfere with each other upon reading out the information (this is called interference effect), such that the difference between the reflectivity at a recorded portion and the reflectivity at a non-recorded portion (i.e., difference in the ratio of light beams which are reflected at the upper and lower interfaces of the recording layer and interfere with each other, and thereafter return to an optical pickup) is large. An information recording medium disclosed in Patent Literature 1 also considers the relationship between the film thickness and the reflectivity as shown in FIG. 3 of this literature, and the paragraph [0062] suggests that the thickness of the recording layer is preferably around $\lambda/4n$, where $\lambda$ is the wavelength of the readout beam, and n is the refractive index of the recording layer, or even thinner to have a thickness of around 5-50 nm.

Another optical information recording medium which does not utilize interference effect as utilized in the above literature is disclosed in Patent Literature 2. According to this known optical information recording medium, a fluorescent-light emission layer is provided under the recording layer, and the light emitted by the fluorescent-light emission layer is detected through the recording layer to read out the information.

CITATION LIST

Patent Literature

Patent Literature 1: Japanese Patent No. 4290650
Patent Literature 2: Japanese laid-open patent application publication No. 2001-325745

SUMMARY OF THE INVENTION

Technical Problem

However, if the interference effect of the reflected beams of light reflected at both interfaces of the recording layer is utilized upon reading out the information as with Patent Literature 1, the recording layer must be produced to have so exact film thickness as designed to obtain an excellent degree of modulation. This requires the accuracy of the film thickness and thus leads to increased manufacturing cost of the optical information recording medium.

Further, if, as with Patent Literature 2, a fluorescent light emitted is regarded as a base light and the modulation is obtained from the variations of the light received by a light detector for detecting how much of the base light returns, it is difficult to obtain an acceptable reproduction output because the emitted fluorescent light is very weak.

In view of the above, the present invention seeks to provide an optical information recording medium, which provides an excellent reproduction output without requiring highly-accurate film thickness of the recording layer.

Solution to Problem

In order to solve the aforementioned problem, the present invention provides an optical information recording medium comprising: a plurality of recording layers; and intermediate layers each provided between the recording layers, wherein first and second intermediate layers having different refractive indices are arranged alternately with one recording layer interposed therebetween, wherein $((n3-n1)/(n3+n1))^2 \leq 0.001$ is satisfied, where n1 represents a refractive index of the recording layer, and n3 represents a refractive index of the second intermediate layer, and wherein when a recording layer is irradiated with a recording beam and generates heat by absorption of the recording beam, an interface between the recording layer and the first intermediate layer adjacent to this recording layer undergoes a change of shape to record information.

With this configuration, since the interface between the recording layer and the first intermediate layer adjacent to this recording layer undergoes a change of shape to record information, the information can be read out using the modulation of the reflectivity at this interface. Further, since the condition $((n3-n1)/(n3+n1))^2 \leq 0.001$ is satisfied, namely, the refractive index n1 of the recording layer and the refractive index n3 of the second intermediate layer are substantially the same, reflection of light substantially does not occur at the interface between the recording layer and the second intermediate layer (hereinafter referred to as a "non-reflection interface" in this specification). Accordingly, it is possible to manufacture the recording layers without the need for consideration of the interference of the reflected beams of light reflected at both upper and lower interfaces of the recording layer and without requiring a thin and highly-accurate film to be fabricated. Further, since the first intermediate layer and the second intermediate layer are arranged alternately, the second intermediate layer having a refractive index substantially the same as that of the recording layer can be adjacently provided on one side of the recording layer by a simple manufacturing process. This is advantageous, as compared with the configuration in which a pair of first and second intermediate layers are interposed between two recording layers so that the second intermediate layer is adjacent to one side of the recording layer, because a less number of intermediate layers is required to provide the second intermediate layer adjacent to one side of the recording layer.

Further, since reflection does not occur at the interface between the recording layer and the second intermediate layer, the readout beam reflected at the interface (hereinafter referred to as a "reflection interface" in this specification) between the recording layer and the first intermediate layer can be detected without interference, and thus an excellent reproduction output can be obtained. Further, since reflection does not occur at the interface between the recording layer and the second intermediate layer, the number of reflection surfaces contained in the optical information recording medium as a whole can be reduced, so that a record/readout beam (i.e., light beam used for recording or reading information; in this specification, the record/readout beam includes a recording beam, a reading beam, and a readout beam obtained by illumination of the reading beam) can reach and return from deeper layers as viewed from the radiation side of the record/readout beam. This is advantageous because the number of recording layers can be increased for multi-layered structure.

In the aforementioned optical information recording medium, it is preferable that $0.001 < ((n2-n1)/(n2+n1))^2 \leq 0.04$ is satisfied.

If the refractive index n1 of the recording layer and the refractive index n2 of the first intermediate layer satisfy the above condition, the number of recording layers can be advantageously increased for multi-layered structure due to moderate reflectivity, while ensuring the intensity of the reflected light required for reading out the information.

In the aforementioned optical information recording medium, it is preferable that the first intermediate layer and the second intermediate layer have the same thickness.

If the first intermediate layer and the second intermediate layer have the same thickness, the first intermediate layer and the second intermediate layer can be formed by a similar layer-formation process, and the manufacture of the optical information recording medium can be readily performed. Further, the reflection interfaces having non-constant pitch can be easily manufactured. Namely, since the reflection interfaces are arranged such that a pitch (distance) corresponding to the thickness of the first intermediate layer and a pitch (distance) corresponding to the thickness of the first intermediate layer plus twice the thickness of the recording layer appear alternately, the distance between the reflection interfaces vary alternately in the thickness direction. Accordingly, a plurality of reflected beams of light reflected at a plurality of reflection interfaces are less likely to interfere with each other, so that an excellent reproduction output can be obtained.

In the aforementioned optical information recording medium, the thickness of the second intermediate layer may be equal to or greater than that of the first intermediate layer, and $n2<n3$ may be satisfied.

With this configuration, since the optical distance (in the thickness direction) of the second intermediate layer is greater than that of the first intermediate layer, variation in the pitch between the reflection interfaces becomes greater and a plurality of reflected beams of light reflected at a plurality of reflection interfaces are less likely to interfere with each other, so that an excellent reproduction output can be obtained.

In the aforementioned optical information recording medium, the recording layer may include polymer binder and dye dispersed in the polymer binder. Further, the dye may contain a multi-photon absorption compound. The use of the multi-photon absorption compound is advantageous for increasing the number of recording layers because absorption is made only at a part, in the thickness direction, of the optical information recording medium to thereby record information only in a particular recording layer.

In the case where the polymer binder described above is used, the recording layer may have a thickness equal to or greater than 50 nm. If the thickness of the recording layer is equal to or greater than 50 nm, which is thicker than the conventional optical information recording medium including polymer binder and dye, the interface between the recording layer and the intermediate layer adjacent to the recording layer can stick out into the intermediate layer to form a protrusion having a centrally protruding shape.

It is preferable that the recording layer, and the first and second intermediate layers are formed by coextrusion. The optical information recording medium consisting of a plurality of layers can be manufactured at low cost by using coextrusion.

Other aspects and advantages of the present invention will become apparent from the following description taken in conjunction with the accompanying drawings.

BRIEF DESCRIPTION OF THE DRAWINGS

FIG. 4 includes views (a) to (c) explaining a process of forming a recess portion in the conventional optical information recording medium.

FIG. 5 is a view explaining interference of reflected beams of light reflected at adjacent reflection interfaces at the time of reading out the information.

FIG. 6 is a diagram showing an optical system suitable for reading out the information.

FIG. 7 is a table showing the results of experiments.

DESCRIPTION OF EMBODIMENT

One exemplified embodiment of the present invention will be described below with reference to the drawings.

Figure 1:
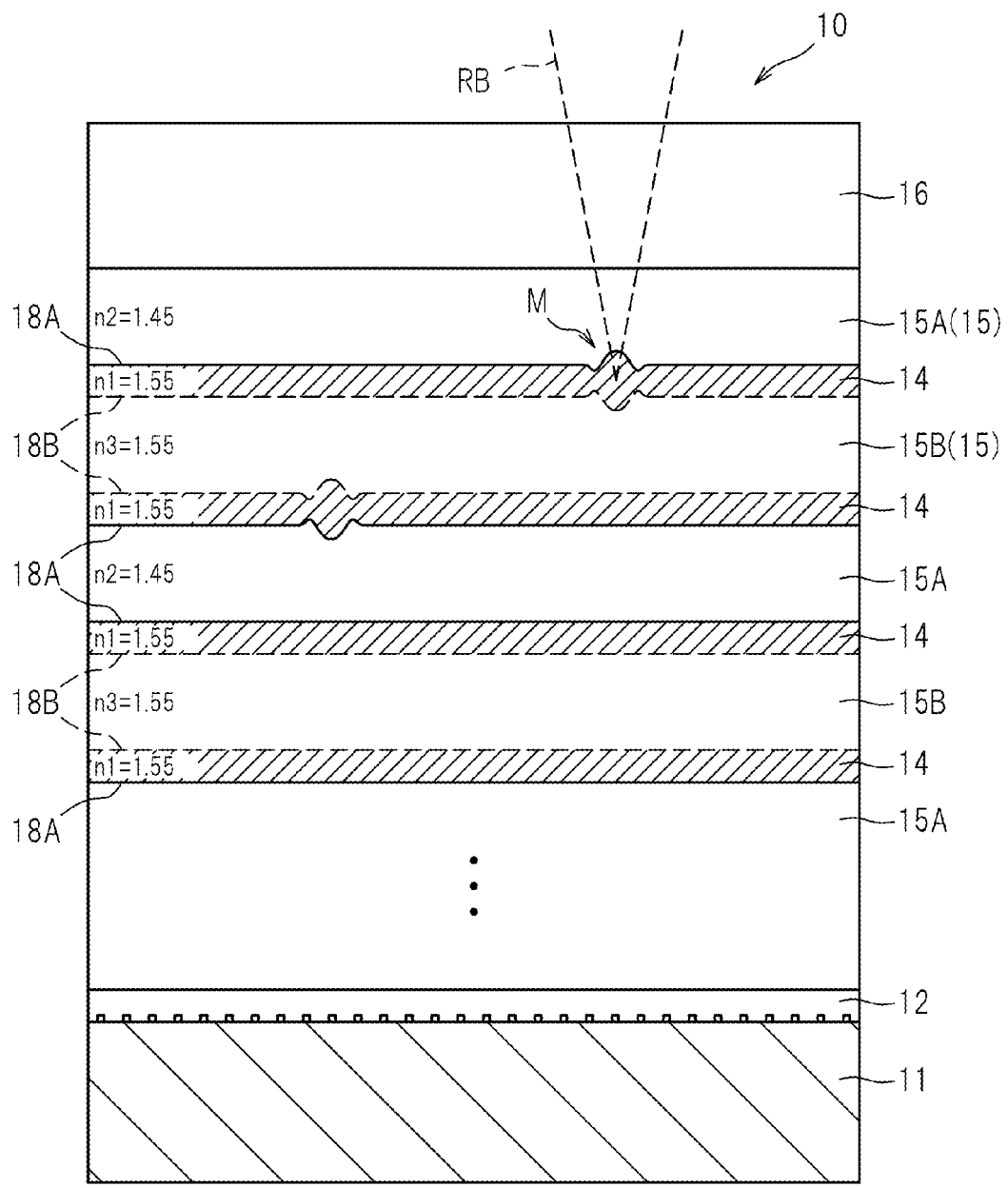
FIG. 1 is a sectional view of a multi-layered optical information recording medium.

As seen in FIG. 1, an optical information recording medium 10 comprises a substrate 11, a servo signal layer 12, a plurality of recording layers 14, a plurality of intermediate layers 15 (first intermediate layers 15A and second intermediate layers 15B), and a cover layer 16. In this embodiment, the interface between the recording layer 14 and the first intermediate layer 15A is a reflection interface 18A, and the interface between the recording layer 14 and the second intermediate layer 15B is a non-reflection interface 18B.

<Substrate>

The substrate 11 is a support member for supporting the recording layers 14 and other layers. As an example, the substrate 11 is a circular plate made of polycarbonate. The material and the thickness of the substrate 11 are not specifically limited.

<Servo Signal Layer>

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 may be optional.

<Recording Layer>

The recording layer 14 is made of a photosensitive material on which information is optically recordable; in this embodiment, the recording layer 14 contains a polymer binder and dye dispersed in the polymer binder. When the recording layer 14 is irradiated with a recording beam, the dye absorbs the recording beam and generates heat. The polymer binder undergoes a change in shape by the generated heat, so that the reflection interface 18A undergoes a change in shape and sticks out into the first intermediate layer 15A to form a protrusion, whereby information is recorded in the recording layer 14. To be more specific, each protrusion is formed, as will be described later, such that the center portion thereof has a shape protruding from the recording layer 14 into the first intermediate layer 15A, and the protrusion is surrounded by a recess portion which is recessed from the first intermediate layer 15A into the recording layer 14.

For this reason, each recording layer 14 is thicker than the conventional recording layer containing a polymer binder and dye, and the thickness of the recording layer 14 is in the range of 50 nm to 5 µm, preferably in the range of 100 nm to 3 µm, and more preferably in the range of 200 nm to 2 µm. If the thickness is less than 50 nm, as with the deformation of the conventional recording layer to be described later, the interface between the recording layer 14 and the intermediate layer 15 (corresponding to the reflection interface 18A or the non-reflection interface 18B in this embodiment) deforms such that a recessed shape is formed in the interface when considering the recording layer 14 as a reference. On the contrary, if the thickness is not less than 50 nm, the interface deforms such that a protrusion is formed at a center of the recorded portion. Although the thickness of the recording layer 14 does not have an upper limit, it is preferable that the thickness thereof is not more than 5 µm in order to increase the number of recording layers 14 as many as possible. In this embodiment, the recording layer 14 has a thickness of 1 µm which is adopted as an example.

In this embodiment, as an example, the number of recording layers 14 provided is approximately 2-100 layers. To increase the storage capacity of the optical information recording medium 10, a large number of recording layers 14, for example, 10 or more recording layers 14 are preferable. Further, the recording layer 14 may be provided such that the refractive index thereof is subject to change before and after recording. However, to keep the non-reflection interface 18B non-reflective before and after recording, it is preferable that the refractive index is insusceptible to change.

It is preferable that the recording layer 14 has an absorption ratio (of one-photon absorption) with respect to the recording beam equal to or less than 5% per one layer. Further, it is more preferable that this absorption ratio is equal to or less than 2%, and it is further more preferable that the absorption ratio is equal to or less than 1%. This is because, for example, if the intensity of the recording beam which reaches the farthermost recording layer 14 has to be equal to or more than 50% of the intensity of the radiated recording beam, it is necessary that the absorption ratio per one recording layer is equal to or less than 2% in order to obtain thirty-layered recording layers, and it is necessary that the absorption ratio per one recording layer is equal to or less than 1% in order to obtain fifty-recording layers. If the absorption ratio is higher, the recording layer 14 is subject to be overheated and a protrusion is less likely to be formed in the reflection interface 18A.

The recording layer 14 may be formed by any conventional method; for example, a dye material and a polymer binder are dissolved in a solvent, followed by spin coating with the obtained liquid to form a recording layer 14. Examples of the solvent may include dichloromethane, chloroform, methyl ethyl ketone (MEK), acetone, methyl isobutyl ketone (MIBK), toluene, and hexane.

Specific examples of the polymer binder used for the recording layer 14 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), and polyvinyl alcohol (PVA).

Examples of the recording beam-absorbing dye used for the recording layer 14 may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption dye, a two-photon absorption compound without having a linear absorption band at the wavelength of a reading beam is preferable.

As long as the two-photon absorption compound does not have a linear absorption band at the wavelength of the reading beam, any known two-photon absorption compound may be used; for example, compounds having a structure represented by the following formula (1) may be used.

[Chem. 1]

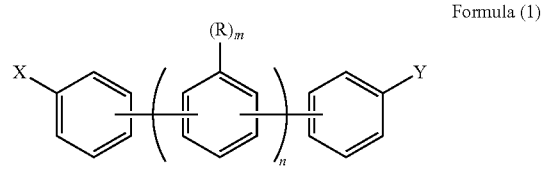

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

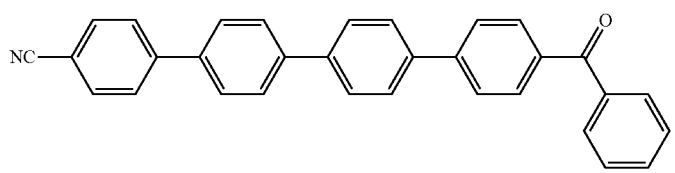
D-1

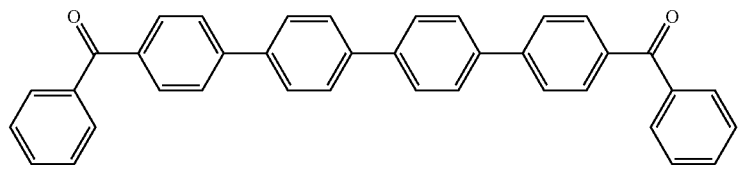
D-2

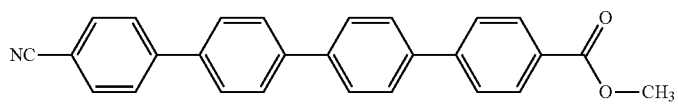
D-3

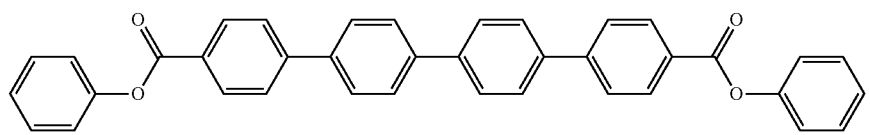
D-4

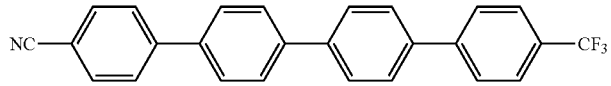
D-5

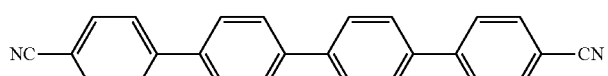
D-6

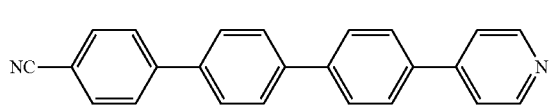
D-7

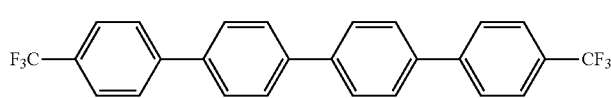
D-8

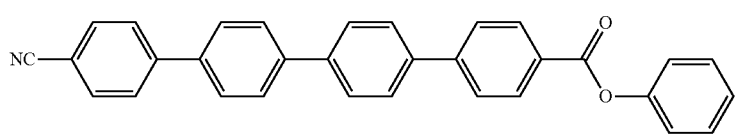
D-9

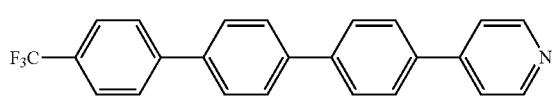
D-10

-continued
D-11
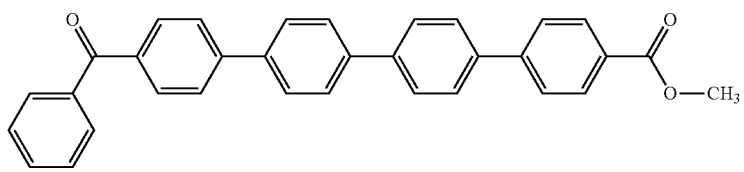
D-12
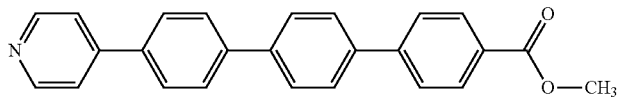
D-13
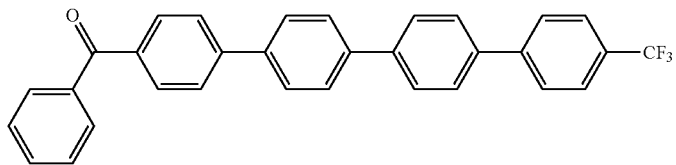
D-14
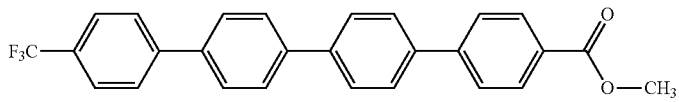
D-15
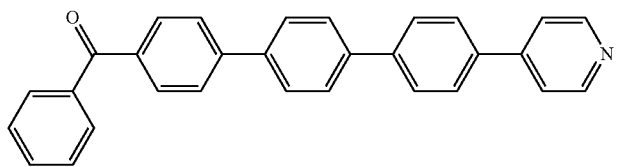
D-16
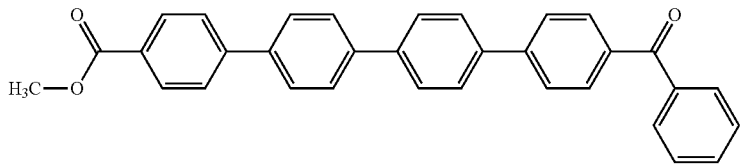
D-17
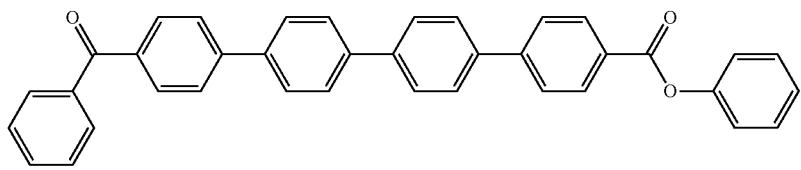
D-18
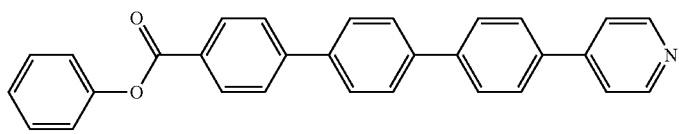
D-19
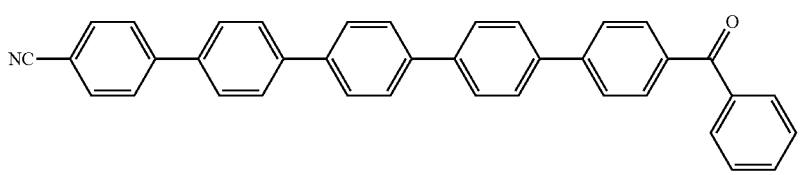
D-20
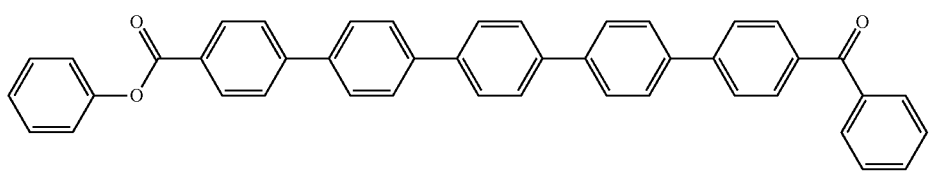

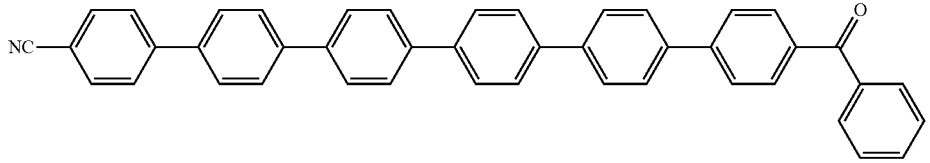

D-21

<Intermediate Layer>

The intermediate layer 15 is provided between the recording layers 14. In other words, intermediate layers 15 (first intermediate layers 15A or second intermediate layers 15B) and the recording layers 14 are arranged alternately. In order to prevent crosstalk across a plurality of recording layers 14 (i.e., phenomenon in which a signal from one recording layer 14 is mixed with another signal from an adjacent recording layer 14), the intermediate layer 15 is provided to form a predetermined amount of space between the adjacent recording layers 14. For this purpose, the thickness of the intermediate layer 15 (first intermediate layer 15A and second intermediate layer 15B) is equal to or more than 3 μm. As an example, the intermediate layer 15 is 10 μm thick in this embodiment. Namely, in this embodiment, the first intermediate layer 15A and the second intermediate layer 15B have the same thickness.

One of the first intermediate layer 15A and the second intermediate layer 15B is provided between two adjacent recording layers 14. Further, the first intermediate layer 15A and the second intermediate layer 15B are arranged alternately with one recording layer 14 interposed therebetween. In other words, as seen in FIG. 1, the first intermediate layer 15A, the recording layer 14, the second intermediate layer 15B, and the recording layer 14 are provided in this order from the cover layer 16 side, and a set of these layers are repeatedly arranged. Of course, this order may be changed into another order starting from the second intermediate layer 15B; namely, from the cover layer 16 side, the second intermediate layer 15B, the recording layer 14, the first intermediate layer 15A, and the recording layer 14 are provided in this order, and a set of these layers are repeatedly arranged.

The first intermediate layer 15A and the second intermediate layer 15B are made of materials which are unreactive to irradiation with a laser beam at the time of recording and reading out the information. Further, in order to minimize the loss of the recording beam, the reading beam, and the readout beam, it is preferable that the first intermediate layer 15A and the second intermediate layer 15B are made of resin which is transparent to the recording beam, the reading beam, and the readout beam. Herein, the term "transparent" indicates that the absorption ratio determined by taking into consideration the absorption ratio of the first intermediate layer 15A and the absorption ratio of the second intermediate layer 15B is equal to or less than 1%.

It is noted that each of the first intermediate layers 15A and the second intermediate layers 15B has a substantially uniform refractive index distribution.

The first intermediate layer 15A and the second intermediate layer 15B have different refractive indices. The second intermediate layer 15B has a refractive index substantially the same as that of the recording layer 14. To be more specific, the recording layer 14 and the second intermediate layer 15B have a comparable refractive index to such an extent that $((n3-n1)/(n3+n1))^2 \leq 0.001$ is satisfied, where n1 represents the refractive index of the recording layer 14, and n3 represents the refractive index of the second intermediate layer, that is, the reflectivity at the non-reflection interface 18B is not more than 0.001 (0.1%).

To prevent reflection at the interface between the recording layer 14 and the second intermediate layer 15B, it is preferable that the refractive indices of the recording layer 14 and the second intermediate layer 15B be as close as possible. To be more specific, the difference between the refractive indices of the recording layer 14 and the second intermediate layer 15B is preferably equal to or lower than 0.05, more preferably equal to or lower than 0.03, further preferably equal to or lower than 0.01, and most preferably 0.

On the contrary, the refractive index of the first intermediate layer 15A is different from that of the recording layer 14 to some appropriate degree such that the following relation is satisfied:

$$0.001 < ((n2-n1)/(n2+n1))^2 \leq 0.04$$

where n2 represents the refractive index of the first intermediate layer 15A.

If the reflectivity is greater than 0.001, the quantity of the reading beam OB reflected at the reflection interface 18A is large, so that a high signal-to-noise ratio is obtained at the time of reading the information. If the reflectivity at the reflection interface 18A is smaller than 0.04, the quantity of the reading beam OB reflected at the reflection interface 18A is restricted to an appropriately small degree, so that the record/readout beam can reach far deeper recording layers 14 without considerable attenuation upon recording and reading out the information. This makes it possible to achieve high storage capacity of the optical information recording medium 10 by providing a large number of recording layers 14.

As an example, the refractive index n1 of the recording layer 14 and the refractive index n3 of the second intermediate layer 15B are both 1.55, and the refractive index n2 of the first intermediate layer 15A is 1.45. In this instance, $((n3-n1)/(n3+n1))^2$ is 0 and $((n2-n1)/(n2+n1))^2$ is 0.0011. Accordingly, the aforementioned inequality expressions are satisfied.

In this embodiment, the first intermediate layer 15A is softer than the recording layer 14. To be more specific, for example, the glass transition temperature of the first intermediate layer 15A is lower than that of the recording layer 14. As an alternative example, the recording layer 14 and the first intermediate layer 15A may be a solid layer and a tacky layer, respectively. These configurations may be obtained by appropriately selecting the polymer binder (resin) used as a material for the recording layer 14 and resin used as a material for the first intermediate layer 15A.

According to the configuration in which the first intermediate layer 15A is softer than the recording layer 14, when the recording layer 14 is heated and expanded by the recording beam RB, the first intermediate layer 15A is easily deformable to facilitate the deformation of the reflection interface 18A.

In order to make the difference between the refractive index n1 of the recording layer 14 and the refractive index n3 of the second intermediate layer 15B smaller and preferably to 0, the composition of the material for the recording layer 14 and the composition of the material for the second intermediate layer 15B can be adjusted. To be more specific, since the material for the recording layer 14 contains dye such as a two-photon absorption compound to be mixed in a polymer binder, the dye or the polymer binder may be selectively adjusted to have an appropriate refractive index and to vary the composition ratio, whereby the refractive index n1 of the recording layer 14 can be optionally adjusted. The refractive index of the polymer binder varies depending on the degree of polymerization even if they have similar basic components. For this reason, the refractive index n1 of the recording layer 14 can also be adjusted using polymer binders with different degrees of polymerization or by adjusting the degree of polymerization of the polymer binder. Further, the refractive index n1 of the recording layer 14 can be adjusted by mixing a plurality of polymer binders. Further, a refractive index matching material (inorganic particulate and the like) may be added to adjust the refractive index n1 of the recording layer 14.

To adjust the refractive index n3 of the second intermediate layer 15B, the degree of polymerization of the polymer material such as resin usable as the material for the second intermediate layer 15B may be adjusted. As an alternative, to adjust the refractive index n3 of the second intermediate layer 15B, a material usable for the intermediate layer 15 may be optionally added or a refractive index matching material (inorganic particulate and the like) may be added.

In this embodiment, the second intermediate layer 15B may have a hardness equal to or higher than the recording layer 14. To be more specific, the second intermediate layer 15B may be formed such that a glass transition temperature thereof is equal to or higher than the glass transition temperature of the recording layer 14. This configuration is achieved by appropriately selecting a resin usable as the material for the recording layer 14 and a resin usable as the material for the second intermediate layer 15B.

The aforementioned recording layer 14, first intermediate layer 15A, and second intermediate layer 15B may be formed by a conventionally-known coextrusion process. Since a plurality of layers are formed at once by coextrusion, the optical information recording medium 10 can be manufactured efficiently and at low cost.

<Cover Layer>

The cover layer 16 is provided to protect the recording layers 14 and the intermediate layers 15 (first intermediate layers 15A and second intermediate layers 15B). The cover layer 16 is made of a material which allows the record/readout beam to pass through the cover layer 16. The cover layer 16 has an appropriate thickness in the range from several tens micro meters to several millimeters.

<Recording and Reading Information>

Description will be given of the method for recording information on and reading out the information from the optical information recording medium 10 as described above.

To record information in a desired recording layer 14, as seen in FIG. 1, the recording layer 14 is irradiated with a laser beam (recording beam RB) output of which is modulated in accordance with the information to be recorded. If the recording layer 14 contains a multi-photon absorption compound as a recording dye, it is preferable that the laser beam used for this recording may be a pulsed laser beam, the peak power of which can be increased. Although a focal position of the recording beam RB is not limited to a specific position, it is preferable that the recording beam RB is focused on or around the reflection interface 18A. It is preferable that the focal position be adjusted on the reflection interface 18A and thereafter slightly shifted toward the recording layer 14.

Figure 2:
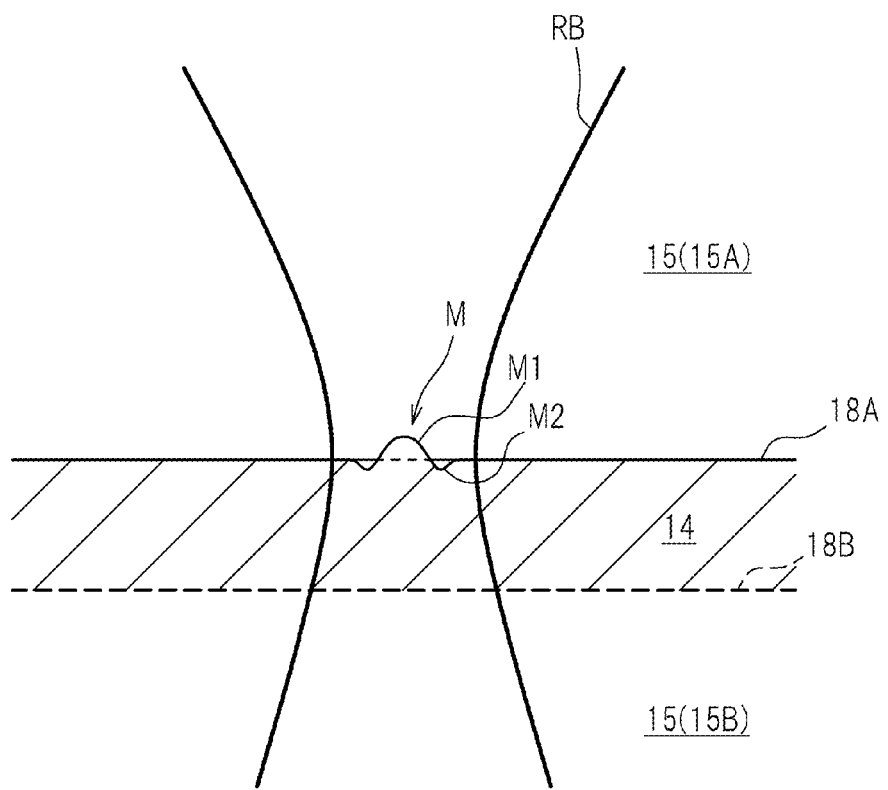
FIG. 2 is a view showing a recording spot formed at the time of recording information.

When irradiating the recording layer 14 with the recording beam RB, the recording beam-irradiated area changes its shape such that the center portion thereof has a shape protruding from the recording layer 14 into the first intermediate layer 15A, to thereby form a recording spot M. More specifically, as seen in FIG. 2, the recording spot M includes a protrusion M1 at the center portion, and a ring-shaped recess portion M2 surrounding the protrusion M1 and recessed into the recording layer 14. The distance (depth) of the recessed portion M2 from the reflection interface 18A (the reflection interface 18A before undergoing a change in shape) to the deepest portion of the recessed portion M2 is smaller than the distance (height) of the protrusion M1 from the reflection interface 18A (the reflection interface 18A before undergoing a change in shape) to the peak of the protrusion M1. In other words, paying attention to the recording layer 14, it can be said that the recording spot M as a whole has a generally protruding shape. Although the principle of formation of the recording spot M having a centrally protruding shape is not elucidated, we assume as follows in comparison with the principle of recess portion formation in the conventionally-known recording method wherein a recessed shape is formed at a center portion of the recording beam-irradiated area (this principle is also based on an assumption).

Explanation is first made on the conventional recording method. According to J. Appl. Phys. 62, 1123 (1987) "Thermal expansion and flow model for pit formation in laser marking of polymeric film optical disks," when a recording material is irradiated with a recording beam RB, the temperature of the recording material is raised and the recording material (recording layer 14) expands as shown in FIG. 4($a$) (the hatched area shows a heated region). And as seen in FIG. 4($b$), the expanding portion outflows due to surface tension. Thereafter, as seen in FIG. 4($c$), the expanded recording material contracts as the temperature of the recording material lowers, with the result that the outflowing portion which has spilt outside the recording beam-irradiated area forms a protrusion because the recording material remains at a position higher than the reference surface (i.e., the upper surface of the recording layer 14), whereas the center portion of the recording beam-irradiated area forms a recess portion lower than the reference surface because the recording material has flowed out.

In contrast, according to the optical information recording medium 10 in this embodiment, the recording layer 14 is subject to thermal expansion by irradiation with the recording beam RB, with the result that as with the conventional recording method, the recording layer 14 sticks out as shown in FIG. 4($a$). However, since the recording layer 14 is relatively thick in this embodiment, the viscosity of the recording layer 14 near the surface of the recording layer 14 is not so low as that of the recording layer 14 in the conventional recording method, and thus outflowing of the recording material such as shown in FIG. 4($b$) does not occur. Accordingly, it is assumed that when the expanded portion contracts as the temperature of the recording material lowers, the recording beam-irradiated area changes from the shape shown in FIG. 4($a$) into the shape shown in FIG. 2 such that a protrusion M1 is left at the center and a recess portion M2 is formed to surround the protrusion M1.

Figure 3:
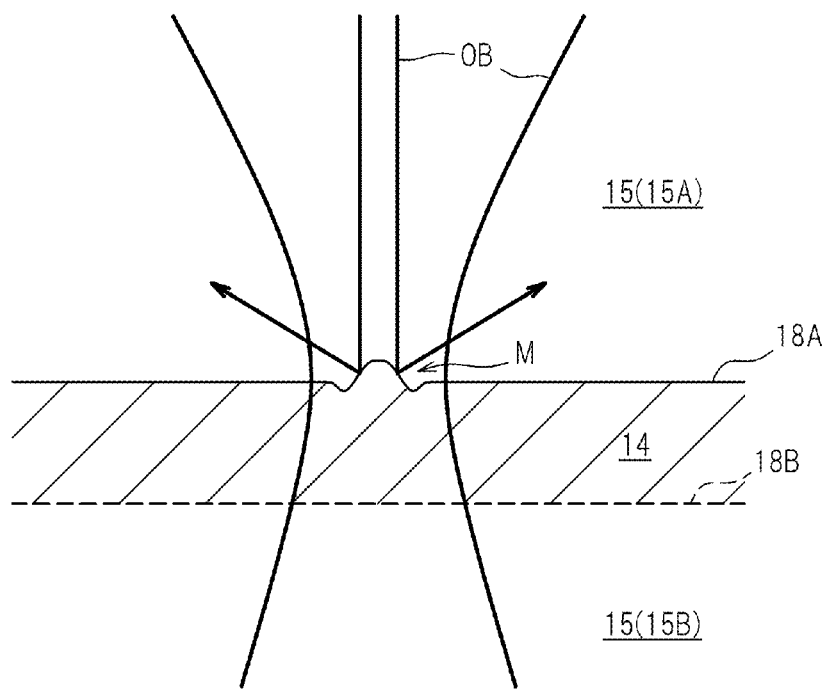
FIG. 3 is a view explaining the time of reading out the information.

As seen in FIG. 3, when the recording spot M formed as described above is irradiated with the reading beam OB using a continuous-wave laser, a difference in light intensity is created between the light reflected at the portion surrounding the recording spot M in the reflection interface 18A and the light reflected at the recording spot M, because of the difference between the refractive index n1 of the recording layer 14 and the refractive index n2 of the first intermediate layer 15A. The recording spot M can be detected from this modulation. For the purpose of this optical detection, it is preferable that the protrusion M1 sticks out approximately in the range of 1-300 nm from the original position of the interface (reflection interface 18A) before undergoing a change in shape.

In this embodiment, since the recording spot M includes the recess portion M2 surrounding the protrusion M1, it is assumed that when the recording spot M is irradiated with the reading beam OB for reading the recording spot M, the light intensity distribution of the reflected light at the recording spot M shows an abrupt change in accordance with the distance from the center of the protrusion M1, as compared to a recording spot M without a recess portion M2 and only including a protrusion M1. This makes it possible to read the recording spot M with high degree of modulation.

The present invention is applicable not only for recording the information by causing the interface between the recording layer 14 and the first intermediate layer 15A adjacent to the recording layer 14 to protrude into the first intermediate layer 15A to form a protrusion, but also for recording the information by forming a recess portion as with the conventional recording method. Further, as seen in FIG. 1, the non-reflection interface 18B may deform upon recording the information in the optical information recording medium 10 according to this embodiment. However, since reflection of the reading beam OB does not occur at the non-reflection interface 18B, this deformation does not affect reading of the information.

As seen in FIG. 5, the optical information recording medium 10 according to this embodiment is configured such that the pitch of the reflection interfaces 18A is not constant and a 12 μm-pitch portion and a 10 μm-pitch portion appear alternately. Accordingly, when a recording spot M is irradiated with the reading beam OB for reading the information, interference may occur between the readout beam SB that is the reflected light reflected by the reflection interface 18A where the recording spot M to be read out is formed and reflected beams of light reflected by a plurality of reflection interfaces 18A adjacent to this reflection interface 18A (reflected beams of light from two reflection interfaces 18A located below this reflection interface 18A are shown in FIG. 5). However, since the pitch of the reflection interfaces 18A is not constant, this interference has less adverse effects on the readout beam SB and an excellent reproduction signal can be obtained. Especially, since the refractive index n3 of the second intermediate layer 15B is greater than the refractive index n2 of the first intermediate layer 15A, the difference in the optical distance between different reflection interfaces 18A is essentially larger than the numerical difference of 12 μm and 10 μm, so that the reflected beams of light from the other reflection interfaces 18A have a very small effect on the readout beam SB upon reading of the information. For this reason, the optical information recording medium 10 is preferably configured such that the thickness of the second intermediate layer 15B is equal to or thicker than that of the first intermediate layer 15A and that n2<n3 is satisfied.

To erase the information recorded in the recording layer 14, the recording layer 14 is heated to a temperature around the glass transition temperature of the polymer binder, preferably to a temperature higher than the glass transition point, so that the fluidity of the polymer binder is increased and the deformation in the reflection interface 18A disappears due to surface tension to thereby return to its original flat plane. As a result, the information recorded in the recording layer 14 can be erased. Because the information is erasable, re-recording in the recording layer 14 (repeated recording) can be achieved. When the recording layer 14 is heated for that purpose, the recording layer 14 may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser used may be the laser used for reading out the information, or alternatively, another laser may be used. In both cases, it is preferable that a laser used emits light having a wavelength absorbable by a one-photon absorption dye.

Further, when the information is to be erased by heating the recording layer 14, the optical information recording medium 10 may be heated as a whole to a temperature higher than the glass transition temperature of the polymer binder so that the information recorded in all the recording layers 14 can be erased at once. Accordingly, irrespective of the kind of dyes contained in the recording layer 14, all the information recorded in the optical information recording medium 10 is easily erased for initialization. Further, when the optical information recording medium 10 is to be disposed of, the information can be easily erased.

When the information is read out from the optical information recording medium 10, the principle of homodyne detection can be used to obtain higher reproduction output. This will be explained with reference to FIG. 6.

If homodyne detection (polarization differential detection) is utilized, as with the configuration of FIG. 6 except for the portions surrounded by the broken line, the reading apparatus 50 includes a laser 51, a PBS (polarizing beam splitter) 52 through which a beam of light from the laser 51 is split into a ray of light incident on a mirror 53 and a ray of light incident on the optical information recording medium 10, a mirror 53 configured to reflect the ray of light emitted from the laser 51 and having passed through the PBS 52, two quarter-wave plates 54, 55 each arranged on the corresponding path of the rays of light having been split by the PBS 52, a half-wave plates 56 and a PBS 57 arranged to receive the beam of light retuned from the optical information recording medium 10 and having passed through the PBS 52, and detectors 59A, 59B configured to detect rays of light split by the PBS 57. With this configuration, the beam of light emitted from the laser 51 is partly caused to pass through the PBS 52 and then return to the PBS 52 after it is reflected by the mirror 53. This beam of light is a reference beam. The remaining part of the beam is reflected by the PBS 52 and goes into the optical information recording medium 10. The beam of light returned from the optical information recording medium 10 is modulated at the recording spots M and then returned to the PBS 52 as a signal beam. When the signal beam and the reference beam being caused to interfere with each other pass through the half wave-plate 56 and enter the PBS 57, a part of them is allowed to pass through the PBS 57 and then detected by the detector 59A, and the other part of them is detected by the detector 59B. The differential signal of the signals detected by the detector 59A and the detector 59B is represented by the following expression:

[Math 1]

$$2\eta\sqrt{I_s I_r} \cos \Delta\phi \tag{1}$$

where $I_s$ and $I_r$ are the intensity of the signal beam and the intensity of the reference beam, respectively, and $\Delta\phi$ is the phase difference between the signal beam and the reference beam. Herein, since the reference beam is not applied to the optical information recording medium 10, the reference beam can be set in principle to the maximum intensity within the upper limit of the light source. For this reason, even if the signal beam strikes the optical information recording medium 10 and the intensity of the signal beam $I_s$ attenuates, it can be amplified using the high-intensity reference beam ($I_r$).

In the above expression (1), the amplification factor will be decreased unless $\Delta\phi$ is fixed at a value around 0. However, since $\Delta\phi$ varies in accordance with the optical distance, it is difficult to fix $\Delta\phi$ at a value around 0 if the optical information recording medium 10 undergoes surface deflection and the like. For this purpose, an additional optical system 60 enclosed by the broken line in FIG. 6 is provided, so that the differential signal is not affected by $\Delta\phi$ through the output is diminished to some extent. The optical system 60 is configured such that a half beam splitter 61 is disposed between the PBS 52 and the half wave-plate 56 to cause the beam of light split by the half beam splitter 61 to enter the PBS 62. Further, detectors 68A, 68B for detecting the beams of light split by the PBS 62 are provided. Using the phase diversity detection technique with this optical system 60, arithmetic operations represented as the following equations are carried out with respect to the differential signal $D_1$ of the signals detected by the detector 59A and the detector 59B and the differential signal $D_2$ of the signals detected by the detector 68A and the detector 68B:

[Math 2]

$$\sqrt{D_1^2+D_2^2}=\eta\sqrt{I_sI_r} \qquad (2)$$

$$\arg(D_1+iD_2)=A\phi \qquad (3)$$

Although the signal of the equation (2) has an output which is a half of the value obtained by $\Delta\phi=0$ in the above equation (1), a stable reproduction signal can be obtained without requiring adjustment for the optical path difference, thanks to the independency from $\Delta\phi$. The equation (3) represents a reproduction signal corresponding to the optical path difference, that is the reproduction signal corresponding to the height of the protrusion.

If the aforementioned homodyne detection (polarization differential detection) or the phase diversity detection is utilized, because of the increased reproduction output, it is possible to read out the information from the intensity of reflection and the height of the protrusion and therefore the signal-to-noise ratio can be improved. As a result, higher recording density by narrowing the dot distance and high-capacity recording by multi-valued recording can be expected.

As described above, in the optical information recording medium 10 according to this embodiment, since information is recorded by the deformation of the reflection interface 18A, the information can be read out using the modulation of the reflectivity at this interface. Further, since the refractive index n1 of the recording layer 14 and the refractive index n3 of the second intermediate layer 15B are substantially the same, reflection of light substantially does not occur at the non-reflection interface 18B. Accordingly, it is possible to manufacture the recording layers 14 without the need for consideration of the interference of the reflected beams of light reflected at both interfaces of the recording layer 14 and without requiring a thin and highly-accurate film to be fabricated. Further, since the first intermediate layer 15A and the second intermediate layer 15B are arranged alternately, the optical information recording medium 10 comprising the reflection interface 18A disposed at one side of the recording layer 14, and the non-reflection interface 18B disposed at the other side of the recording layer 14 can be easily manufactured.

Further, since reflection does not occur at the interface between the recording layer 14 and the second intermediate layer 15B, the readout beam SB reflected at the reflection interface 18A can be detected without interference, and thus an excellent reproduction output can be obtained. Further, since reflection does not occur at the interface between the recording layer 14 and the second intermediate layer 15B, the number of reflection surfaces can be reduced, so that the record/readout beam can reach deeper layers as viewed from the radiation side of the record/readout beam. This is advantageous because the number of recording layers 14 can be increased for multi-layered structure.

Further, in the optical information recording medium 10 according to this embodiment, information is recorded by forming in the reflection interface 18A recording spots M, each of which has a protruding shape protruding from the recording layer 14 to the first intermediate layer 15A. During this recording, the recording layer 14 does not require high fluidity (high energy to be given therefor), which leads to recording at high sensitivity.

Although one exemplary embodiment of the present invention has been described above, the present invention is not limited to the above-described embodiment and various changes and modifications may be made where necessary.

For example, in the above embodiment, the thickness of the recording layer 14 is equal to or greater than 50 nm. However, the thickness of the recording layer 14 may be less than 50 nm. Further, in the above embodiment, both of the one-photon absorption dye and the multi-photon absorption dye are used as the dye by way of example. However, only one of the one-photon absorption dye and the multi-photon (two-photon) absorption dye may be used.

EXAMPLES

Description will be given of experiments confirming that information can be recorded in an optical information recording medium by causing an interface between a recording layer and an intermediate layer to be deformed into the intermediate layer to form a protrusion, and experiments for testing of erasing the protrusion from the optical information recording medium. As described above, it is not necessary in the present invention that the interface deforms into the intermediate layer.

1. Recording Material

In these examples, a recording material which contains a polymer binder and dye dispersed in the polymer binder was used.

(1) Polymer Binder

Polyvinyl acetate (from Across Co., Ltd.; Mw: 101600) or polymethylmethacrylate (from SIGMA-ALDRICH Corporation) was used as the polymer binder.

(2) Dye

Either one of or both of phthalocyanine-based one-photon absorption dye with the following structure C-1 and two-photon absorption dye with the following structure C-2 were used as the dye.

[Chem. 3]

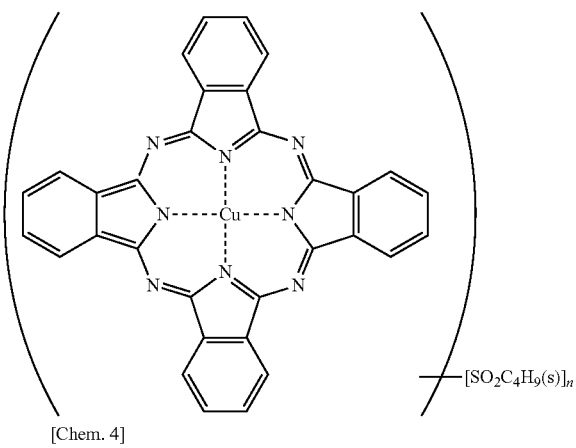

C-1

[Chem. 4]

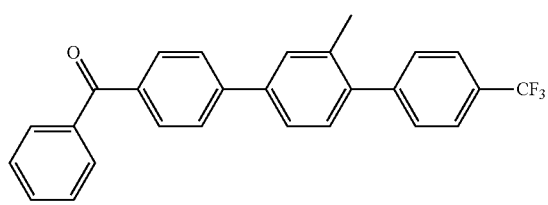

C-2

2. Formation Method for Recording Layer

Dye and a polymer binder were dissolved in a solvent (described later) while stirring to obtain a coating liquid. The coating liquid was applied to a glass substrate by spin coating to form a film on the glass substrate. The thickness of the film was 1 μm. The refractive index of the glass substrate was 1.53.

3. Thermal Analysis Method for the Material

The glass transition temperature of the polymer binder and the melting point and the decomposition point of the dye were determined by the following method.

Analytical method: TG-DTA (thermogravimetric/differential thermal analyzer) measurement Device: TG-DTA6300 (from Seiko Instruments Inc.)

Rate of temperature increase: 10° C./min

Measured temperature range: from 25° C. to 600° C.

Measured atmosphere: nitrogen ($N_2$) atmosphere

The following temperatures were used as the glass transition temperature, the melting point, and the decomposition point (or vaporization temperature).

(1) Glass Transition Temperature

In an endothermic reaction of the polymer binder without weight reduction, the peak temperature was regarded as the glass transition temperature.

(2) Melting Point

In an endothermic reaction of the dye without weight reduction, the peak start time obtained by extrapolation was regarded as the melting point.

(3) Decomposition Point (or Vaporization Temperature)

The decomposition point (or vaporization temperature) was determined as the temperature at which the weight of the dye was reduced by 10% as compared to the dye before the decomposition. If a plurality of decomposition points existed, the lowest temperature was used for comparison.

Results of this thermal analysis were shown in the following table.

TABLE 1

| | Glass transition temperature [° C.] | Melting point [° C.] | Decomposition temperature [° C.] |
|---|---|---|---|
| Polymer binder | | | |
| Polyvinyl acetate | 32 | — | — |
| polymethylmethacrylate | 104 | — | — |
| polybisphenol-A-carbonate | 147 | — | — |
| One-photon absorption dye C-1 compound | — | — | 349 |
| Two-photon absorption dye C-2 compound | — | 138 | 301 |

4. Test/Estimation Method for Recording and Reading Information

The recording layer was irradiated with a recording beam (pulsed laser: wavelength of 522 nm, repetition frequency of 3 GHz, pulse width of 500 fsec, average power Pa of 5-50 mW, and peak power Pp of 3-33 W) with the peak power of 10 W.

With respect to the recording layer, the focal position of the recording beam was moved in the optical axis direction by 0.4 μm increments from 0.4 to 4 μm (i.e., 11 points in the depth direction), and a test was performed for four points each including these 11 focal positions, namely the total of 44 recording positions were tested.

Recording conditions were adjusted by changing the recording time from 5 μs to 5 ms. The recording time [μs] required for recording 12 recording spots (i.e., 3 points at adjacent focal positions in each depth direction times the four points) was measured to obtain data.

Observations were made on some of these examples using an atomic force microscope (AFM) and an optical microscope. Observation conditions were as follows:

Atomic Force Microscope

Device: Nano Search Microscope OLS-3500 (manufactured by Olympus Corporation)

Observation conditions: Dynamic mode, Scanning range of 10 μm, Scanning speed of 1 Hz, With the use of High-aspect-ratio probe AR5-NCHR-20 (manufactured by Nano World AG)

Optical Microscope

Device: ECLIPSE LV 150 (manufactured by Nikon Corporation)

Observation conditions: Objective lens ×100, Dark-field observation

Further, the recording spot was illuminated with the reading beam using a 405 nm continuous-wave laser (CW laser) with the power of 0.5 mW, and the quantity of the reflected light was read.

Degree of modulation was defined by the following equation and calculated with reference to the experimental results:

Degree of modulation={(Quantity of light reflected at the non-illuminated area)−(Quantity of light reflected at the illuminated area)}/(Quantity of light reflected at the non-illuminated area)

5. Conditions of Examples and Comparative Examples

Conditions of examples and comparative examples were as follows:

Example 1

| Solvent | methyl ethyl ketone (MEK) | 7 g |
|---|---|---|
| Dye | C-1 compound | 15 mg |
| Polymer binder | polyvinyl acetate (PVAc) | 500 mg |

Example 2

Conditions of Example 2 were the same as those of Example 1, except that the following compound was used as the dye.

| Dye | C-2 compound | 72 mg |
|---|---|---|

Example 3

Conditions of Example 3 were the same as those of Example 1, except that the following two compounds were used as the dye.

| Dye | C-1 compound | 15 mg |
|---|---|---|
|  | C-2 compound | 72 mg |

Example 4

Conditions of Example 4 were the same as those of Example 2, except that the polymer binder was replaced with the following one:

| Polymer binder | polymethylmethacrylate (PMMA) | 500 mg |
|---|---|---|

Comparative Example 1

Unlike Example 2, the recording layer was produced without using the polymer binder and only with the C-2 compound (two-photon absorption dye).

Comparative Example 2

Conditions of Comparative Example 2 were the same as those of Example 2, except that the polymer binder was replaced with the following one:

| Polymer binder | polybisphenol-A-carbonate (from SIGMA-ALDRICH Corporation; Mw: 29000) | 500 mg |
|---|---|---|

6. Results

With respect to the above Examples and Comparative Examples, configurations and recording times were shown in FIG. 7.

As seen in FIG. 7, in Examples 1-4, the glass transition temperature of the polymer binder was lower than the melting point or the decomposition point of the dye. Recording spots were formed in all of Examples 1-4.

Figure 8:
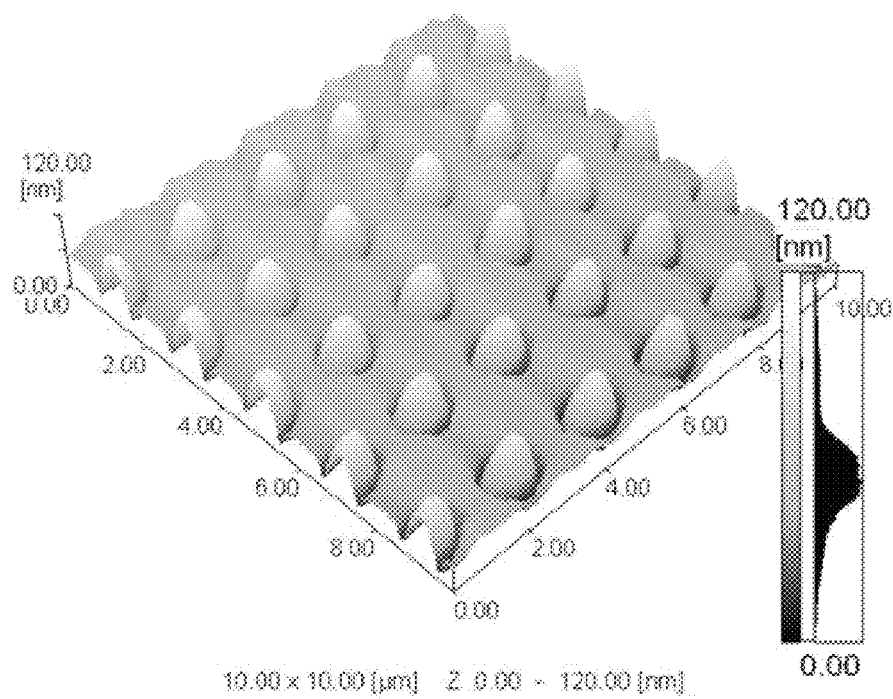
FIG. 8 is an image of the recording spots obtained by an atomic force microscope.
Figure 9:
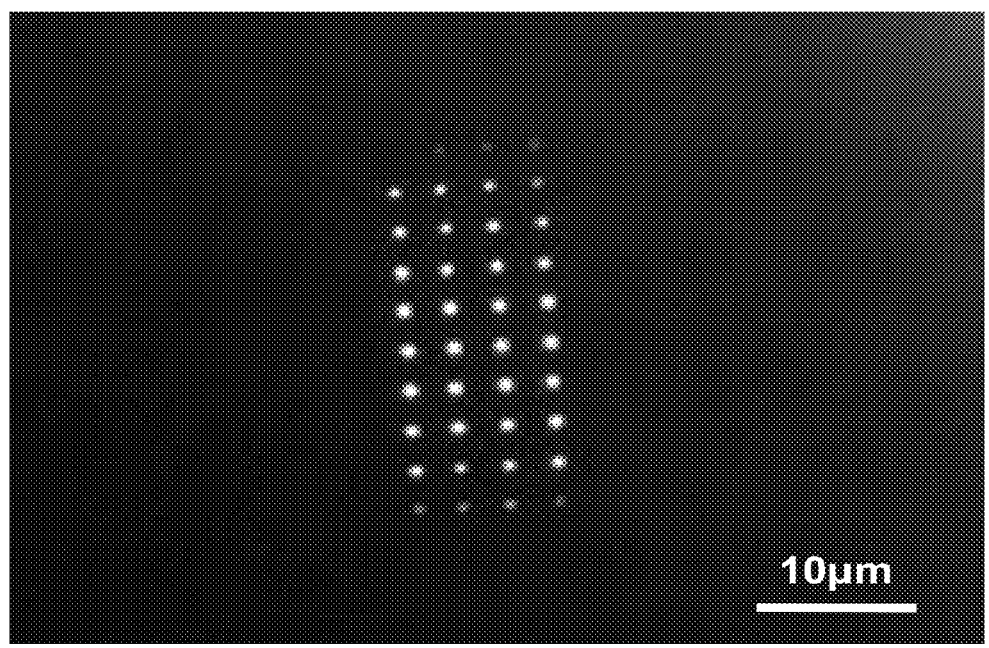
FIG. 9 is an image of the recording spots obtained by an optical microscope.

Shapes of the recording spots recorded in Example 2 were measured using the AFM, and the measurement results were shown in FIG. 8 in three dimensions. Recording spots recorded in Example 2 were observed using the optical microscope, and the observed image was shown in FIG. 9. As shown in FIG. 8, each of the recording spots has a protrusion at a center thereof, and a recess portion surrounding the protrusion. Further, as seen in FIG. 9, recording spots were clearly shown in the observation using the optical microscope, which means that optical reading of the recording spots could be successfully carried out.

In the above Example 2, the recording test was carried out without providing an intermediate layer, however, a similar recording test was carried out by applying a tacky agent on the recording layer to form an intermediate layer. Thereafter, the intermediate layer was removed and then the observation was carried out using the atomic force microscope; in this observation too, recording spots each having a protruding shape similar to that observed in the above Example 2 could be observed. The glass transition temperature of the intermediate layer (tacky agent) used was −53° C.

Figure 10:
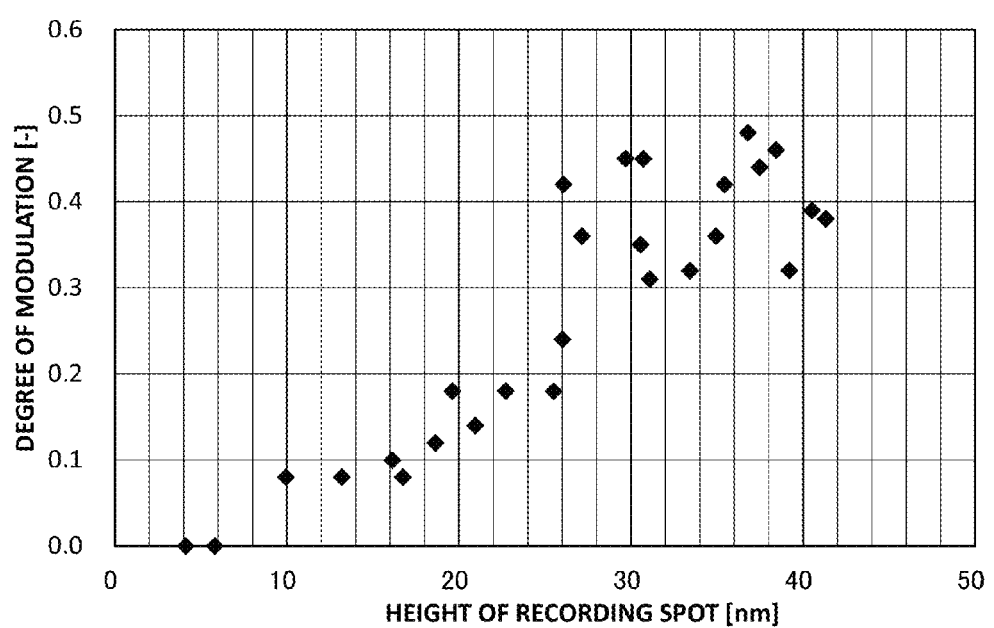
FIG. 10 is a graph showing the relationship between the height of each recording spot and the degree of modulation.

Further, the measurement was carried out for the plurality of recording spots by measuring the height from the upper surface of the recording layer, which was determined as the height before undergoing a change in shape, and the relationship between the height of each recording spot and the degree of modulation was shown as distribution in FIG. 10. FIG. 10 revealed that the higher the height of the recording spot the more the degree of modulation becomes. To ensure the degree of modulation being 0.1, it is preferable that the height of the protrusion in the recording spot is equal to or more than 10 nm, and to ensure 0.2, it is preferable that height of the protrusion is equal to or more than 25 nm. The image of the recording sports observed by the optical microscope as shown in FIG. 9 was obtained by shifting the focal position as it goes from upper to lower positions. Variation in the heights of the recording spots was derived from this shift of the focal position. As is clear from FIG. 9, the height of the protrusion became higher at the recording spot in which the focus was more precisely brought in the recording layer, and a higher degree of modulation was obtained. On the contrary, the height of the protrusion became lower at the recording spot in which the focus was shifted farther from the recording layer, and a lower degree of modulation was obtained. In other words, it can be said that the height of the protrusion in the recording spot (degree of modulation) can be adjusted by adjusting the focal position.

Reference is now made to Examples 1-3, in which polyvinyl acetate was used as the polymer binder. When only the two-photon absorption dye (C-2) was used as the dye (Example 2), it took 90 μsec to form a recording spot. When only the one-photon absorption dye (C-1) was used as the dye (Example 1), it took 15 μsec to form a recording spot. Further, when both of the one-photon absorption dye (C-1) and the two-photon absorption dye (C-2) were used as the dye, it took only 5 μsec to form a recording spot. Namely, recording at the highest sensitivity was observed when both of the one-photon absorption dye and the two-photon absorption dye were used.

In Example 4, the polymer binder with a higher glass transition temperature was used, and it took more time to form a recording spot than Examples 1-3. However, recording could still be made in only 450 μsec.

In Comparative Example 1, a recording spot was not formed under conditions of no polymer binder and with a smaller absorption ratio of 1.8%.

In Comparative Example 2, a recording spot was not formed under conditions that the glass transition temperature of the polymer binder was higher than the melting point of the dye and the recording beam had the peak power of 10 W.

The above results show that an optical information recording medium according to these examples enables recording with high sensitivity. According to the research paper entitled: "The static recording and read out of the twenty-recording layers containing organic dye materials" (Yuki Suzuki et al.; ISOM'09 Technical Digest, P. 202 (Presentation number: Tu-PP-09), the purpose of which is to achieve recording in the recording layer using one-photon absorption dye to be decomposed by irradiation with a laser beam and even with a low absorption ratio of the recording layer, a recording medium with twenty recording layers was produced such that the absorption ratio of the recording beam per one recording layer was equal to lower than 16%, and recording was carried out using a 2.8 mw, 405 nm laser diode. In this instance, recording in the first recording layer was made by irradiation duration from 8 to 400 ms. Even when comparing the above Examples with this report, it was shown that a high sensitivity recording was performed in the optical information recording medium.

[Erasing Records]

The optical information recording media with recording spots formed in Examples 1-3 (i.e., media containing polyvinyl acetate as the polymer binder) were heated for one hour at 80° C. using an oven. The optical information recording medium with recording spots formed in Example 4 (i.e., medium containing polymethylmethacrylate as the polymer binder) was heated for one hour at 120° C. using an oven. In any of these optical information recording media, the recording spots disappeared, which showed that the records were erasable.

What is claimed is:

1. An optical information recording medium comprising:
a plurality of recording layers; and
intermediate layers each provided between the recording layers,
wherein first and second intermediate layers having different refractive indices are arranged alternately with one recording layer interposed therebetween,
wherein $((n3-n1)/(n3+n1))^2 \leq 0.001$ is satisfied,
where n1 represents a refractive index of the recording layer, and n3 represents a refractive index of the second intermediate layer, and
wherein when a recording layer is irradiated with a recording beam and generates heat by absorption of the recording beam, an interface between the recording layer and the first intermediate layer adjacent to this recording layer undergoes a change of shape to record information.

2. The optical information recording medium according to claim 1, wherein $0.001 < ((n2-n1)/(n2+n1))^2 \leq 0.04$ is satisfied,
where n2 represents a refractive index of the first intermediate layer.

3. The optical information recording medium according to claim 1, wherein the first intermediate layer and the second intermediate layer have the same thickness.

4. The optical information recording medium according to claim 1, wherein the thickness of the second intermediate layer is equal to or greater than that of the first intermediate layer, and wherein $n2 < n3$ is satisfied,
where n2 represents a refractive index of the first intermediate layer.

5. The optical information recording medium according to claim 1, wherein the recording layer includes polymer binder and dye dispersed in the polymer binder.

6. The optical information recording medium according to claim 5, wherein the dye contains a multi-photon absorption compound.

7. The optical information recording medium according to claim 5, wherein the recording layer has a thickness equal to or greater than 50 nm.

8. The optical information recording medium according to claim 1, wherein the recording layer, and the first and second intermediate layers are formed by coextrusion.

* * * * *